US009650915B2

(12) United States Patent
Calza et al.

(10) Patent No.: US 9,650,915 B2
(45) Date of Patent: May 16, 2017

(54) AEROFOIL ARRAY FOR A GAS TURBINE WITH ANTI FLUTTERING MEANS (71) Applicant: GE AVIO S.R.L., Rivalta di Torino (IT)

(72) Inventors: Paolo Calza, Arco (IT); Matteo Usseglio, Coazze (IT)

(73) Assignee: GE AVIO S.R.L., Rivalta di Torino (IT)

( * ) Notice: Subject to any disclaimer, the term of this patent is extended or adjusted under 35 U.S.C. 154(b) by 339 days.

(21) Appl. No.: 14/407,051

(22) PCT Filed: Jun. 14, 2013

(86) PCT No.: PCT/IB2013/054892
§ 371 (c)(1),
(2) Date: Dec. 10, 2014

(87) PCT Pub. No.: WO2013/186756
PCT Pub. Date: Dec. 19, 2013

(65) Prior Publication Data
US 2015/0110604 A1    Apr. 23, 2015

(30) Foreign Application Priority Data
Jun. 14, 2012 (IT) .............................. TO2012A0517

(51) Int. Cl.
F01D 5/16    (2006.01)
F01D 25/06   (2006.01)
(Continued)

(52) U.S. Cl.
CPC .............. F01D 25/06 (2013.01); F01D 5/16 (2013.01); F01D 5/22 (2013.01); F01D 5/225 (2013.01);
(Continued)

(58) Field of Classification Search
CPC ... F01D 5/16; F01D 5/225; F01D 5/22; F01D 9/041; F01D 25/06
See application file for complete search history.

(56) References Cited

U.S. PATENT DOCUMENTS 1,534,721 A  *  4/1925  Lasche ..................... F01D 9/02
                                                    415/119
3,536,417 A  *  10/1970 Merkle ................. F04D 29/284
                                                    415/119

(Continued)

FOREIGN PATENT DOCUMENTS

EP         1 447 525 A1    8/2004
WO      2013/018073 A1    2/2013

Primary Examiner — John K Fristoe, Jr.
Assistant Examiner — Behnoush Haghighian
(74) Attorney, Agent, or Firm — Maschoff Brennan (57) ABSTRACT An aerofoil array for a gas turbine system has an inner annular platform and an outer annular platform, which extend about a longitudinal axis and radially delimit an annular channel for a gas flow; the annular channel houses a plurality of aerofoils, arranged at a substantially constant angular pitch and comprising respective central portions and respective ends connected to the platforms; the aerofoils are formed by two series of aerofoils having a different geometrical feature in order to intentionally vary the eigenfrequencies and arranged about the longitudinal axis with a sequence that is regularly repeated all along the annular channel; even though the external geometry of the aerofoils is varied, the cross-sections remain unchanged in the central portions, at any given radius with respect to the longitudinal axis.

6 Claims, 8 Drawing Sheets (51) Int. Cl.
*F01D 5/22* (2006.01)
*F01D 9/04* (2006.01)

(52) U.S. Cl.
CPC .......... *F01D 9/041* (2013.01); *F05D 2220/32* (2013.01); *F05D 2250/312* (2013.01); *F05D 2260/961* (2013.01); *Y02T 50/671* (2013.01); *Y02T 50/673* (2013.01)

(56) References Cited

U.S. PATENT DOCUMENTS

| | | | |
|---|---|---|---|
| 4,097,192 A | 6/1978 | Kulina | |
| 4,108,573 A | 8/1978 | Wagner | |
| 5,156,529 A | 10/1992 | Ferleger et al. | |
| 5,286,168 A * | 2/1994 | Smith | F01D 5/16 416/193 A |
| 5,299,914 A * | 4/1994 | Schilling | F01D 5/141 416/203 |
| 5,667,361 A * | 9/1997 | Yaeger | F01D 5/22 416/193 R |
| 7,037,078 B2 | 5/2006 | Soupizon et al. | |
| 7,118,330 B2 * | 10/2006 | Tsuru | F01D 5/141 415/191 |
| 8,678,752 B2 * | 3/2014 | Delvaux | F01D 5/142 415/119 |
| 8,684,685 B2 * | 4/2014 | Delvaux | F01D 5/3007 415/194 |
| 2008/0134504 A1 * | 6/2008 | Schoenenborn | F01D 5/005 29/889.1 |
| 2010/0247310 A1 * | 9/2010 | Kelly | F01D 5/10 416/1 |
| 2010/0322755 A1 * | 12/2010 | Tecza | F01D 9/041 415/1 |
| 2012/0099995 A1 * | 4/2012 | Delvaux | F01D 5/30 416/203 |
| 2014/0072432 A1 * | 3/2014 | Woehler | F01D 5/027 416/175 |

\* cited by examiner

AEROFOIL ARRAY FOR A GAS TURBINE WITH ANTI FLUTTERING MEANS

TECHNICAL FIELD

The present invention relates to an aerofoil array for a gas turbine system.

BACKGROUND ART

In the field of gas turbines for aircraft engines, there has long been awareness of the need to increase performance by reducing weight as much as possible. In time, this has lead to the construction of arrays of aerofoils that, on the one hand are subjected to high aerodynamic loads and, on the other, have increasingly smaller thicknesses and therefore inevitably have low rigidity, both flexural and torsional.

The reduced rigidity of the aerofoils has, inevitably, resulted in the construction of turbines that have been found to be unstable under certain functional conditions. In particular, this instability is due to marked sensitivity to aeroelastic phenomena deriving from aerodynamic interactions between the aerofoils of a same turbine stage, with the consequent triggering of vibrations that stress the arrays, leading them to structurally critical conditions, as well as generating noise emissions.

This phenomenon of self-induced aeroelastic vibrations, known as flutter, thus defines a constraint in the design of arrays. Typically, aerofoils can be made more rigid to minimize this phenomenon, with a consequent increase in their weight that, as explained above, is undesirable.

As an advantageous alternative, it is known to vary, in the design of the array, the characteristics of a part of the aerofoils so as to diverge from a standard configuration of axial symmetry.

In other words, the geometry and/or the relative position of the aerofoils in each array is/are determined so as to intentionally "detune" or "mistune" the eigenfrequencies of the critical vibrations modes between a first set of aerofoils with respect to those of a second set, and to alternate the aerofoils of the first set with those of the second set to form the array.

In this way, it is found that the aerodynamic interactions between adjacent aerofoils of different types are reduced, thereby rendering the entire array more vibrationally stable.

In known solutions with aerofoils having intentionally detuned eigenfrequencies, aerodynamic efficiency usually drops. In fact, by varying the geometry on the high and low pressure sides and/or on the leading and trailing angles between aerofoils of the first and second sets, the outflow conditions (pressure, gas flow directions, etc.) in the various inter-blade channels change radically with respect to that designed in a standard type of axial-symmetric situation.

U.S. Pat. No. 4,097,192 describes a turbine rotor that is intended to reduce flutter without impairing aerodynamic efficiency. In this case, the detuning is accomplished without altering the external geometry and the pitch between the aerofoils, but by making a recess in a radial end of the aerofoils of the first set and by making the aerofoils of the second set with fully solid blades.

In this rotor, the above-stated radial ends must be free and so they are not connected to each other by any outer annular platform. However, in some applications it is opportune, or even necessary, that the rotor has an outer annular platform interconnected with the aerofoils, for which the solution of U.S. Pat. No. 4,097,192 cannot be effectively adopted.

Furthermore, the machining for removing material and making the recesses at the radial end of a part of the aerofoils takes extra production time and costs.

Another drawback of known solutions lies in the fact that the aerofoils of the first and second sets, by being individually produced with different geometrical characteristics, require dedicated storage and handling systems and different identification codes. In addition, in the assembly phase, it is opportune to provide several reference and positioning systems for mounting the various aerofoils in the correct position, as designed.

DISCLOSURE OF INVENTION

The object of the present invention is to produce an aerofoil array for a gas turbine system, which constitutes a valid alternative with respect to the solution disclosed in U.S. Pat. No. 4,097,192, to resolve the above-described drawbacks in a relatively simple and inexpensive manner.

According to the present invention, an aerofoil array for a gas turbine system as defined in claim 1 and an aerofoil array for a gas turbine system as defined in claim 7 are provided.

BRIEF DESCRIPTION OF THE DRAWINGS

The invention will now be described with reference to the attached drawings, which illustrate some non-limitative embodiments, where.

BEST MODE FOR CARRYING OUT THE INVENTION

Figure 1:
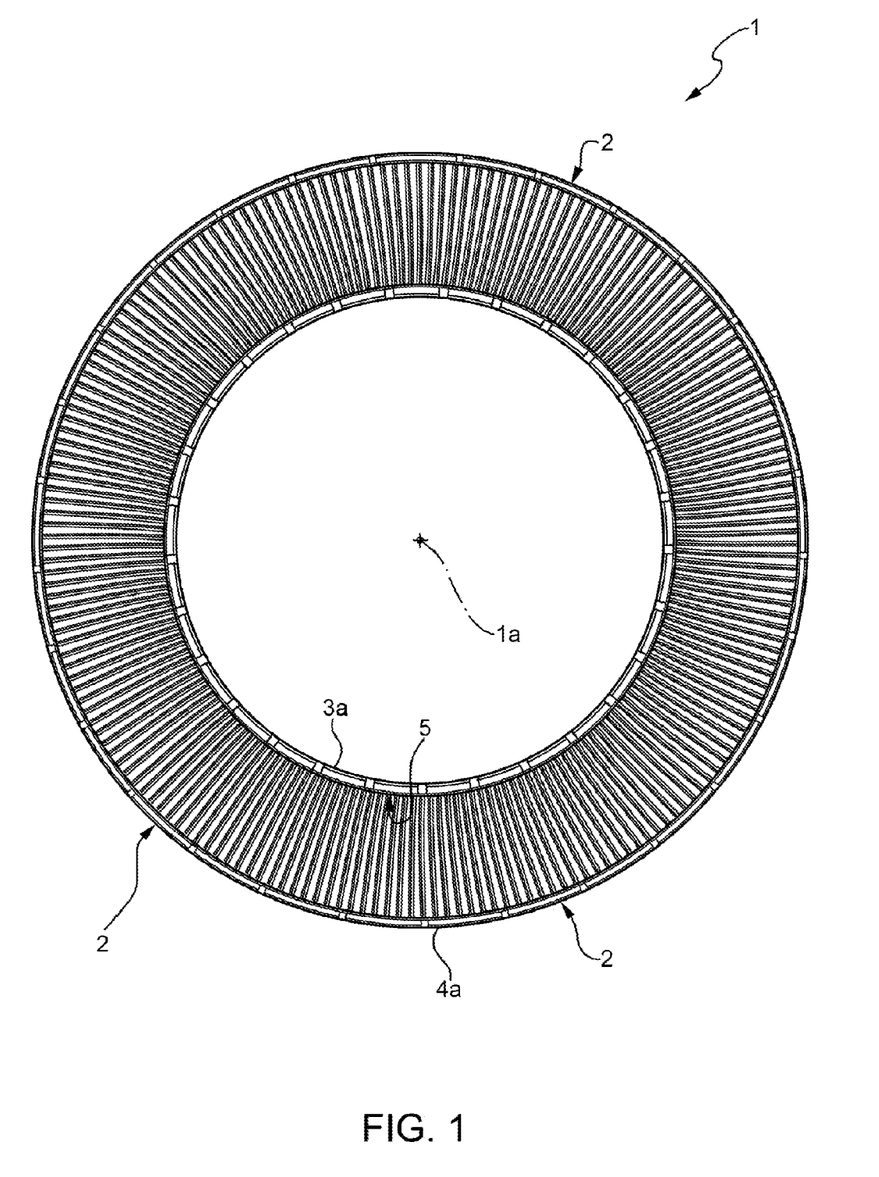
FIG. 1 is a simplified front view of a first aerofoil array for a gas turbine system provided according to the principles of the present invention.

In FIG. 1, reference numeral 1 indicates an aerofoil array that, in the example shown, constitute part of a stator in a turbine stage, forming part of a gas turbine system (not shown).

The array 1 comprises a plurality of sectors 2, which are arranged side by side in a circumferential direction about an axis 1a, which coincides with the axis of the turbine stage.

Figure 2:
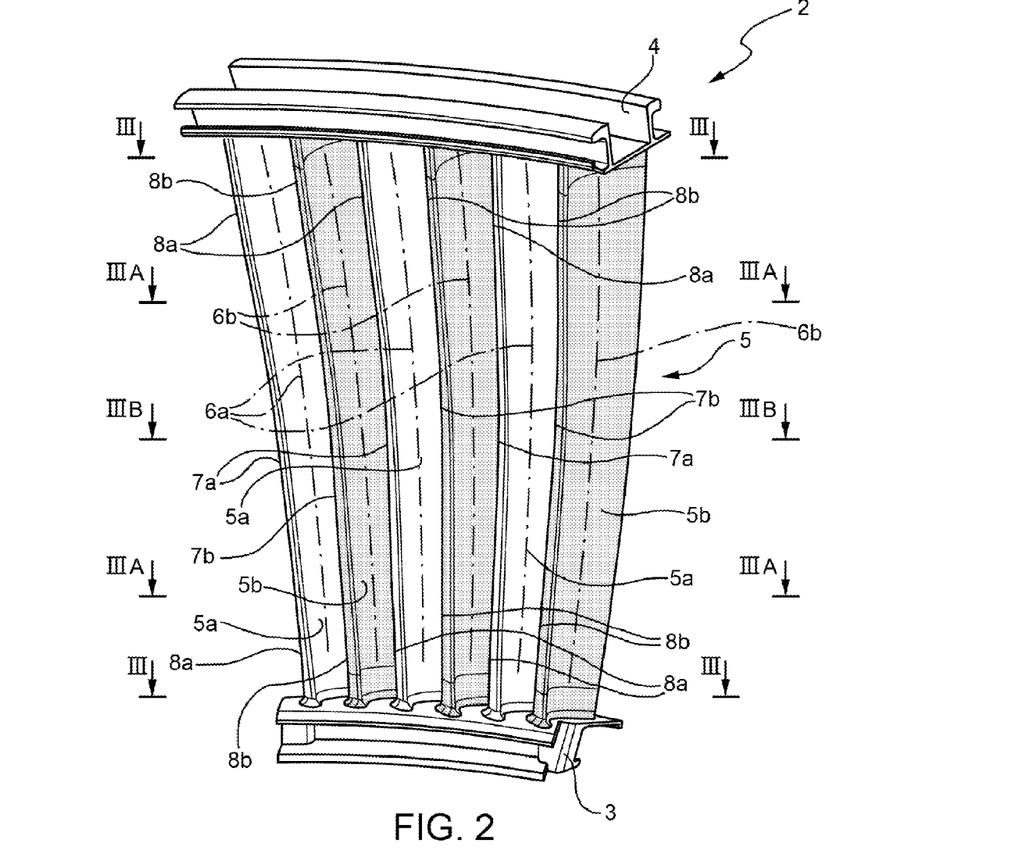
FIG. 2 is a perspective, in an enlarged scale, of a sector of the first array in FIG. 1.

According to a preferred aspect of the present invention, the sectors 2 are identical and are defined by respective monolithic bodies, each of which has been made in a single piece, for example, via casting in opportune dies. As can be seen in FIG. 2, each sector 2 comprises at least two aerofoils 5a and 5b, having outer shapes that, on the whole, are different from each other, as will be better explained hereinafter. Therefore, each sector 2 forms a kind of module that is repeated along the circumference of the stator in the assembly phase. In the specific example, this module comprises six aerofoils in all.

Each module or sector 2 further comprises an inner portion 3 and an outer portion 4, which extend about the axis 1a like arcs of a circle and rest in a circumferential direction against and/or are respectively connected to portions 3 and 4 of adjacent sectors 2, so as to form an inner annular platform 3a and an outer annular platform 4a (FIG. 1), which are generally indicated by the term "end-walls". It is evident that the platforms 3a and 4a radially delimit an annular channel 5 (FIG. 1), which guides the gas flow in the turbine and houses the aerofoils 5a and 5b.

Figure 3:
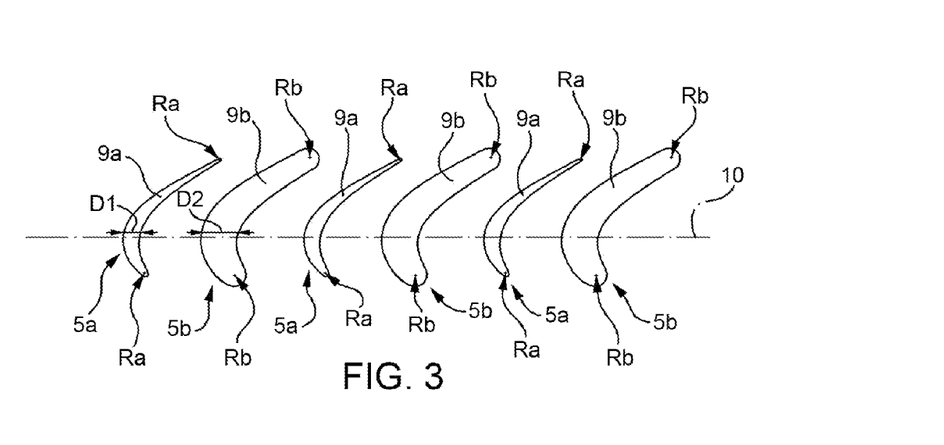
FIGS. 3, 3a and 3b are cross-sections of the aerofoils of the sector in FIG. 2, made with certain radii with respect to the centre of the array, respectively along section lines III-III, IIIa-IIIa and IIIb-IIIb and of FIG. 2.

Still with reference to FIG. 2, the aerofoils 5a and 5b extend along respective directions 6a and 6b, which are substantially radial with respect to axis 1a, can be curved or straight, are arranged in the same axial position and with a constant pitch along the platforms 3a and 3b, and define the directions in which the cross-sections 9a and 9b of the aerofoils 5a and 5b are stacked (FIG. 3). These cross-sections are obtained with curved sectional surfaces corresponding to the theoretical gas flow trajectories.

The aerofoils 5a and 5b are constituted by respective central portions 7a and 7b and by respective ends 8a and 8b, which define connecting portions that join the central portions 7a and 7b to the platforms 3a and 4a. The central portion 7a and 7b is generally indicated by the term "midspan" and by convention has an extension in the radial direction that ranges from 20% to 80% of the height of the aerofoils 5a and 5b.

Figure 3A:
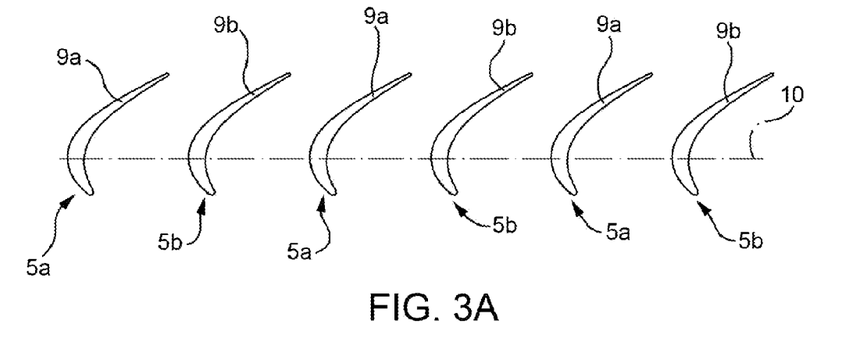
Figure 3B:
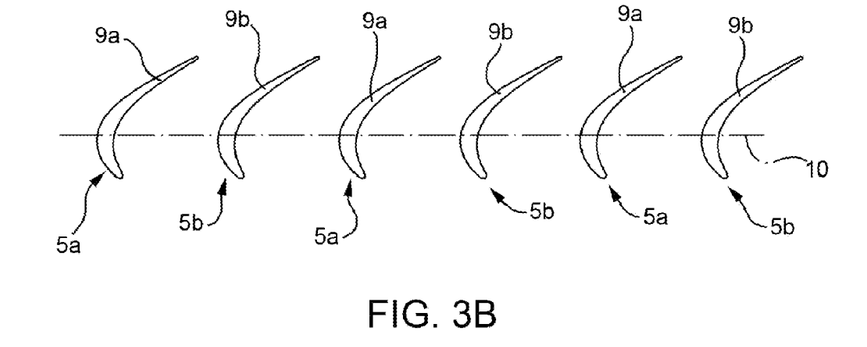

According to one aspect of the present invention, as is also visible in FIGS. 3a and 3b, on sectioning the central portions 7a and 7b at any given radius with respect to axis 1a, the outline of cross-section 9a is geometrically identical to that of cross-section 9b, i.e. in shape and dimensions. Obviously, the cross-sections 9a and 9b can vary in the radial direction, namely along directions 6a and 6b, in a gradual and mutually identical manner, in terms of shape and/or dimensions.

In the embodiment shown in FIG. 2, directions 6a and 6b are identical (after a rotation about axis 1a equal to the pitch), i.e. they have the same curvature, for example both straight, and have the same inclination with respect to an ideal plane orthogonal to axis 1a. Therefore, the central portions 7a and 7b are arranged at a perfectly constant distance along a circumferential direction 10 and are not axially staggered, i.e. they have respective leading edges and respective trailing edges that are aligned in the circumferential direction.

At the same time, at least one of the two ends 8a is different from the corresponding end 8b, as visible in FIG. 3. Therefore, the array 1 comprises at least two series or sets of aerofoils 5a and 5b, which are geometrically different in outer shape only at the outer radial end and/or the inner radial end. The cross-section 9b of ends 8b is wider with respect to the cross-section 9a of ends 8a (at the same radius with respect to axis 1a). In other words, at any given radius with respect to axis 1a, cross-section 9a at ends 8a and 8b has a perimeter or outline that extends completely within the perimeter or outline of cross-section 9b (after a rotation about axis 1a equal to the pitch between directions 6a and 6b). Therefore, cross-section 9a has a dimension D1 measured along a circumferential direction 10 (FIG. 3) smaller than a dimension D2 of cross-section 9b measured in the same direction 10. Furthermore, at ends 8a, the high-pressure side and the low-pressure side are joined to the leading edge and the trailing edge by smaller radii Ra than the corresponding radii Rb at ends 8b.

Preferably, ends 9b define compound fillets, i.e. with radii of variable curvature when passing from the high-pressure side and the low-pressure side to the surface of the platforms.

According to another aspect of the present invention, the aerofoils 5a and 5b are arranged according to a sequence or pattern that is regularly repeated in a circumferential direction. In the specific example of FIG. 2, this pattern is defined by the alternation of a single aerofoil aerofoil 5a and a single aerofoil 5b.

Figure 7:
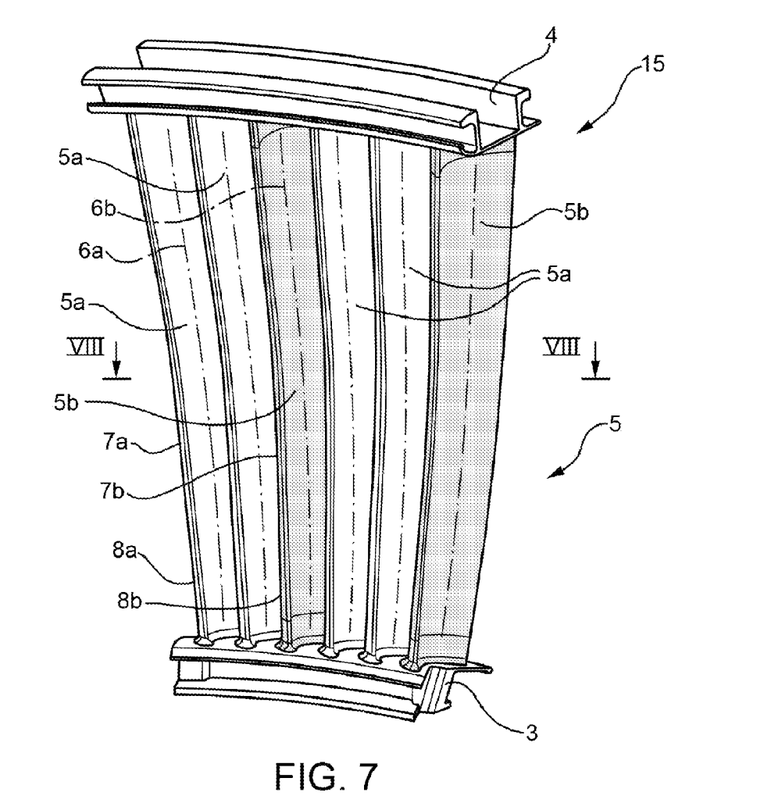
FIGS. 7 to 10 are similar to FIGS. 2 and 3 and show two other variants.
Figure 8:
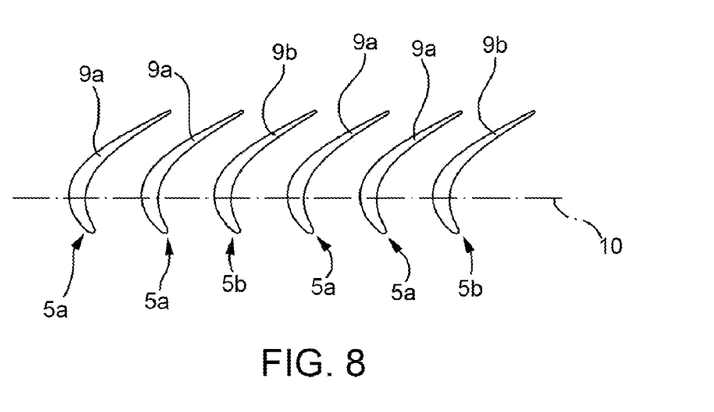

In the variant in FIGS. 7 and 8, the pattern is defined by the alternation of a pair of aerofoils 5a and a single aerofoil 5b.

Figure 9:
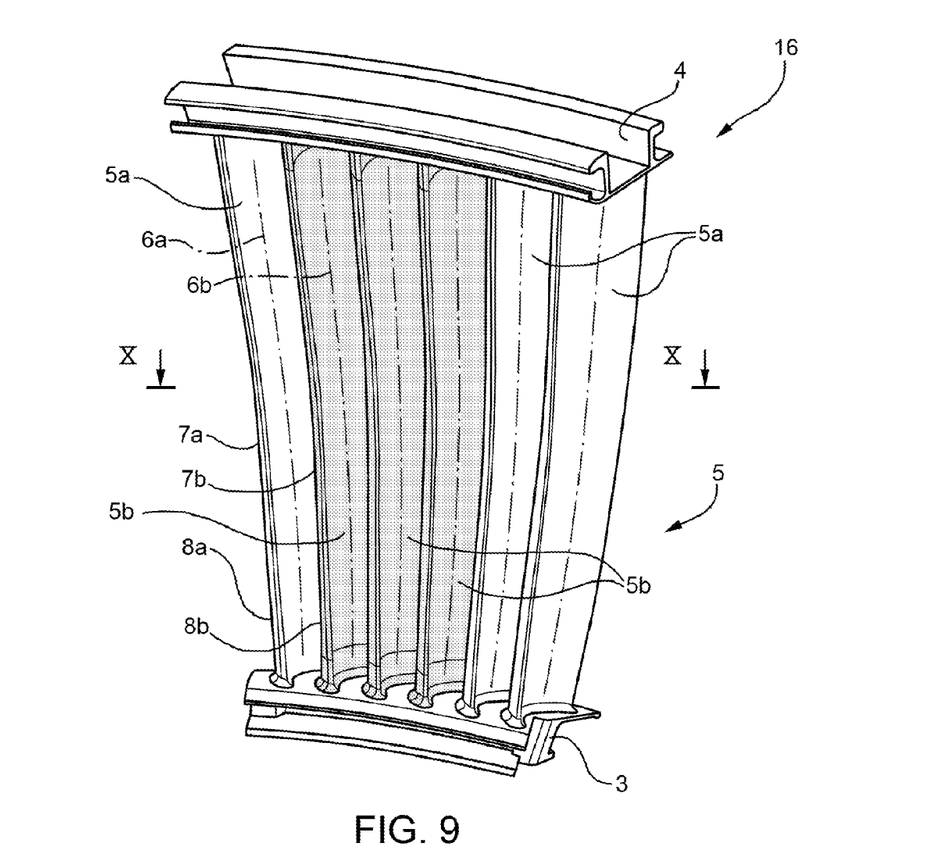
Figure 10:
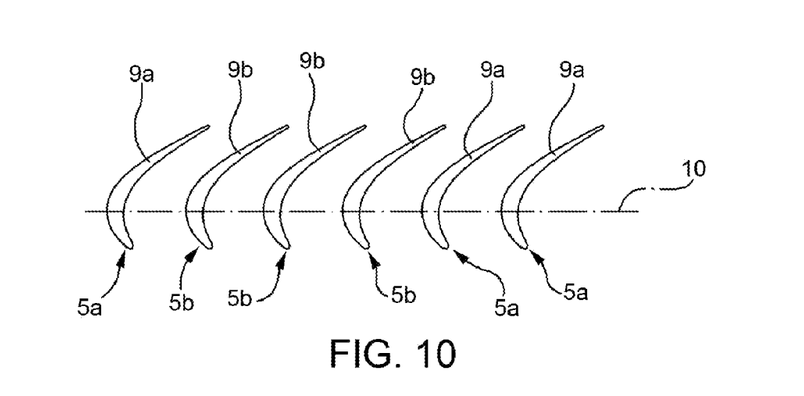

In the variant in FIGS. 9 and 10, the pattern is defined by the alternation of a set of three aerofoils 5a and a set of three aerofoils 5b. Obviously, the pattern chosen in the design phase could be different from those indicated by way of example.

The different width of ends 8b with respect to that of ends 8a enables intentionally detuning the eigenfrequencies of the aerofoils 5a and 5b, while still keeping the central portions 7a and 7b unchanged to obtain the aerodynamic efficiency established by design.

In particular, to preserve high aerodynamic efficiency, it is important that factors which disturb the aerodynamic conditions at the centre of the channel 5 do not come into play. Usually, the gas flow at the centre of the channel 5 is not disturbed by the effects and losses due to secondary flows that form in the boundary layer close to platforms 3a and 4a and which significantly affect the zones of channel 5 at its radial ends. Furthermore, at each given radius along the central portions 7a and 7b (i.e. at least between 20% and 80% of the radial dimension of the channel 5), the gas flow encounters the same inlet and outlet angles and the same profile of the high-pressure and low-pressure sides of the aerofoils, and so no disturbance is introduced.

At the same time, the geometrical variation (shape and/or dimensions) of ends 8b with respect to ends 8a only moderately alters aerodynamic efficiency, as it is implemented in a zone already affected by other losses due to the secondary flows.

Figure 4:
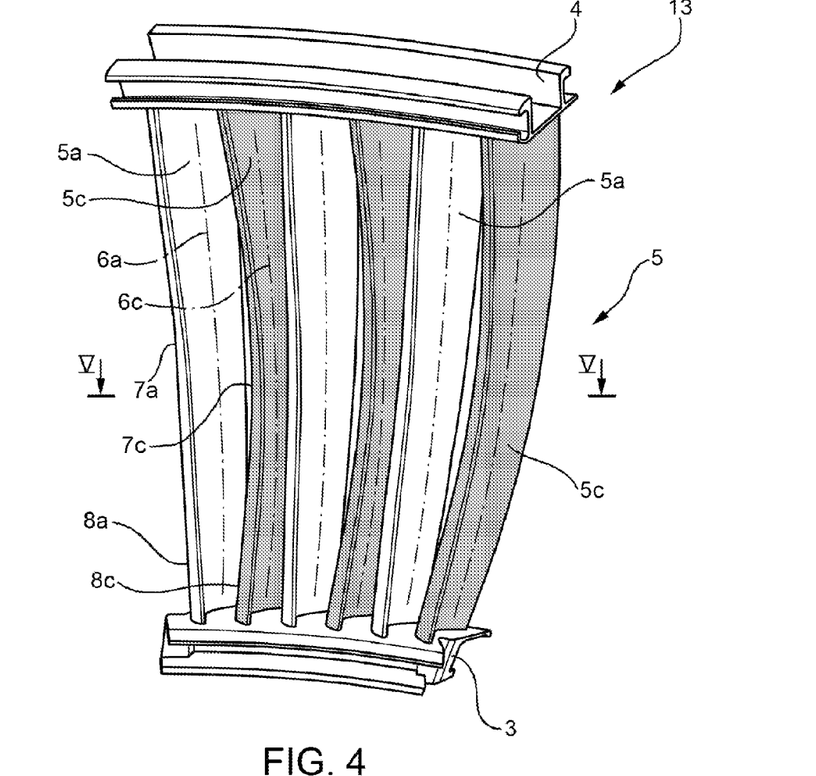
FIGS. 4 and 5 are similar to FIGS. 2 and 3, respectively, and show a sector of a second aerofoil array for a gas turbine system, provided according to the principles of the present invention.
Figure 5:
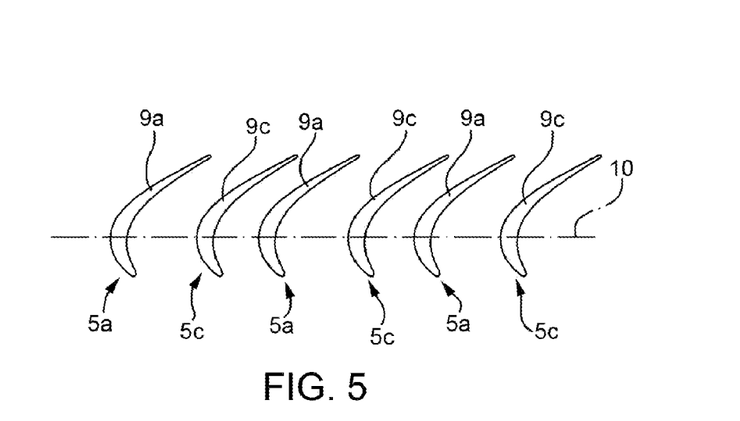

FIGS. 4 and 5 show a sector 13, the constituent parts of which are indicated, where possible, with the same reference numerals used for sector 2, but aerofoil 5b is replaced by aerofoil 5c, which extends along a direction 6c having a different curvature from that of direction 6a. Even so, cross-sections 9a are identical to cross-sections 9c for any given radius, even at the ends 8a and 8c.

In other words, on sectioning the aerofoils 5a and 5c at any radius with respect to axis 1a, cross-section 9a is identical to the corresponding cross-section 9c, but the overall outer shapes of aerofoils 5a and 5c are different due to the curvature. As visible in FIG. 5, the different curvature of directions 6a and 6c results in a translation of sections 9c with respect to that shown for sections 9b in FIG. 3. Therefore, due to the curvature, some zones of the aerofoils 5a and 5c will have a slight shifting in the angular pitch and/or a slight staggering in the axial direction between the leading edges and/or between the trailing edges.

Figure 6:
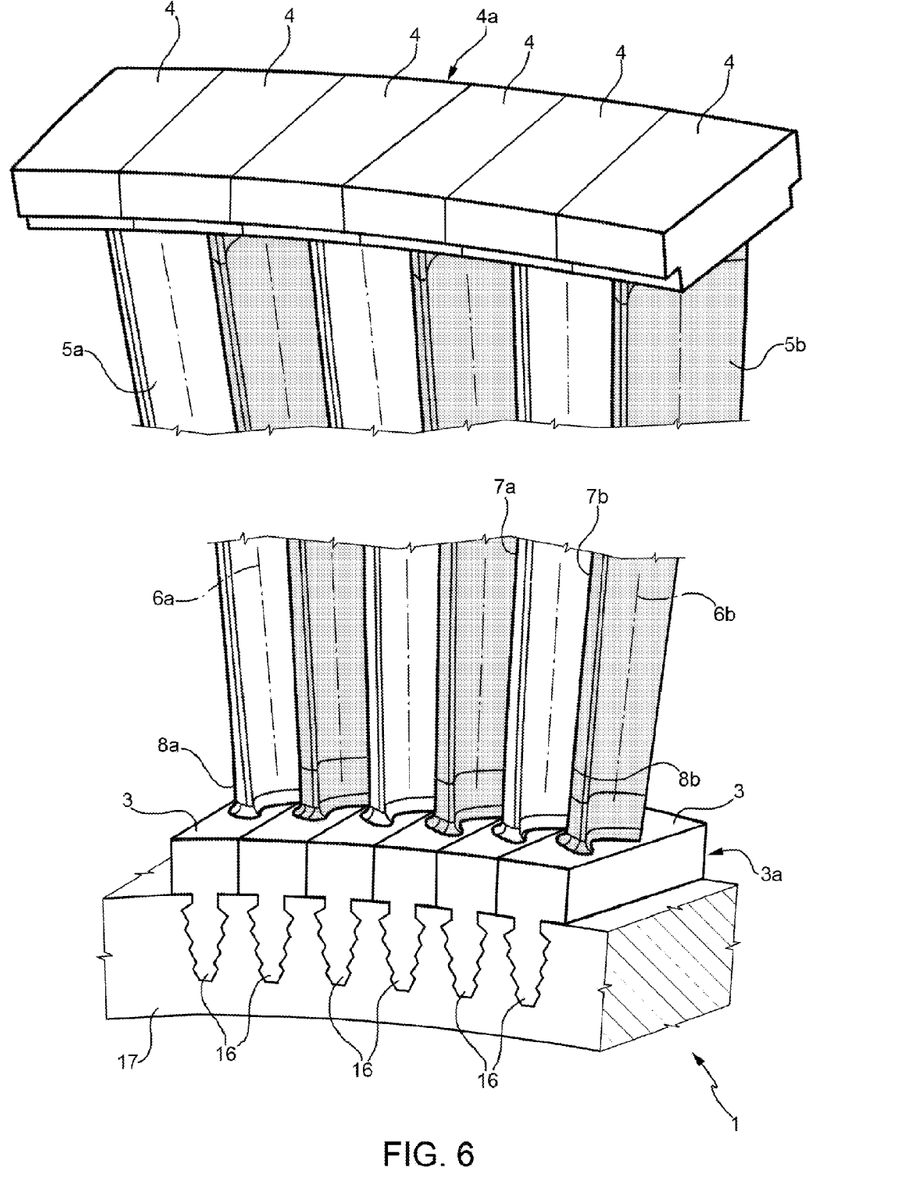
FIG. 6 is similar to FIG. 2 and shows, in an enlarged scale and with parts removed for clarity, a variant of FIG. 2.

FIG. 6 shows a variant in which the array 1 constitutes part of a rotor, instead of a stator. In particular, for each aerofoil 5a and 5b, the array 1 comprises an associated root secured in a corresponding seat provided in the circumference of a hub 17. By grouping at least two aerofoils in sectors made in a single piece (FIG. 11), it is possible to apply the above-described modular concept also in the case of the rotor.

According to a further variant that is not shown, the array 1 comprises aerofoils 5b and 5c, without aerofoils 5a.

Figure 11:
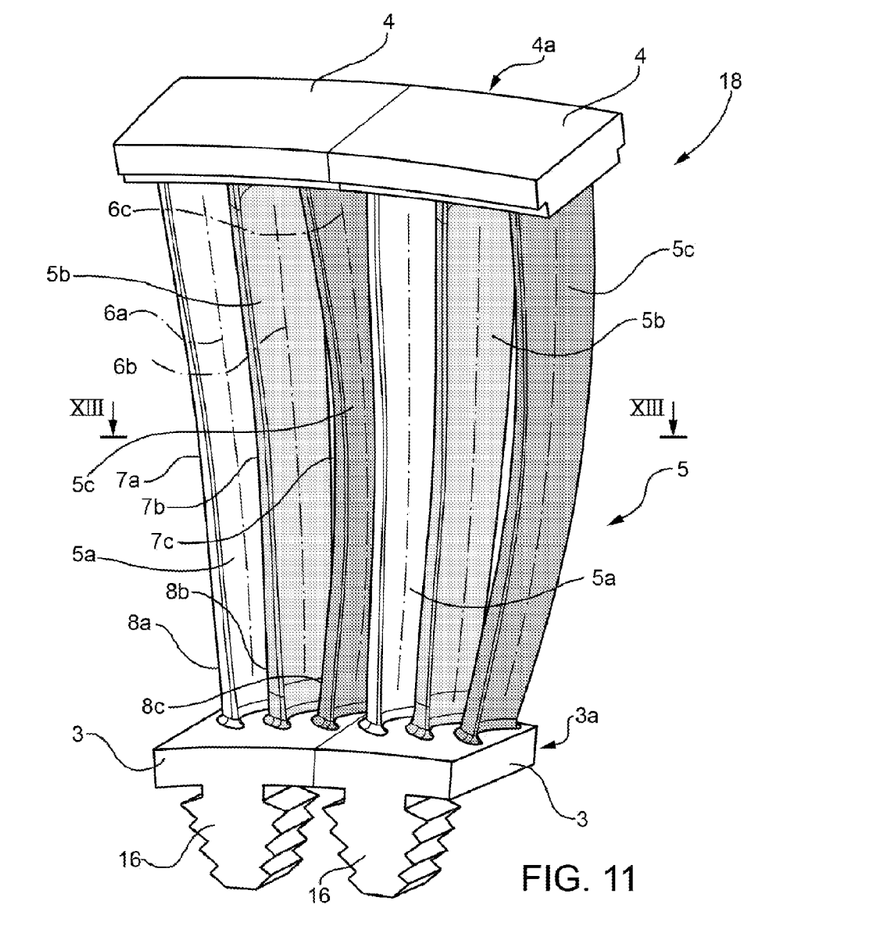
FIGS. 11 and 12 are also similar to FIGS. 2 and 3 and show a sector of a third aerofoil array for a gas turbine system, provided according to the principles of the present invention.
Figure 12:
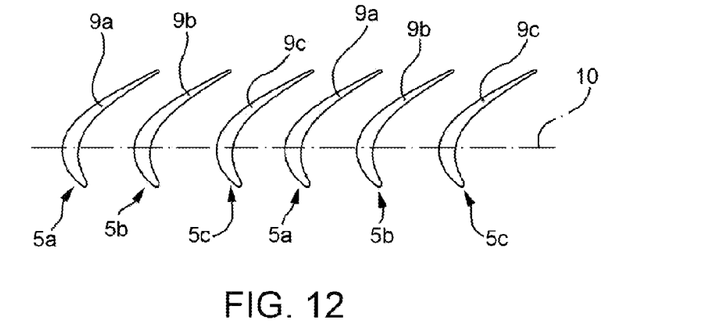

FIGS. 11 and 12 show a sector 18, the constituent parts of which are indicated, where possible, with the same reference numerals used for sectors 2 and 13. Sector 18 differs from sectors 2 and 13 basically in the fact of comprising three series of aerofoils, alternated with one another in a sequence or pattern that, also in this case, is regularly repeated all along the circumferential direction 10 of the channel 5. In particular, sector 18 comprises aerofoils 5a the same as those shown in FIGS. 2 and 4, aerofoils 5b the same as those shown in FIG. 2 and aerofoils 5c the same as those shown in FIG. 4.

Therefore, aerofoils 5a, 5b and 5c have different external geometries, but all comprise respective central portions 7a, 7b and 7c where the cross-section, obtained at any given radius, has the same outline.

More specifically, the sequence or pattern is defined by the alternation of a single aerofoil 5a, a single aerofoil 5b and a single aerofoil 5c, but could be different from this example.

According to a further variant that is not shown, the array comprises a series of aerofoils that differ from aerofoil 5a in that they have the addition of a simple rib, arranged on the high-pressure side, preferably on the central portion 7a, and substantially parallel to a plane tangential to the gas flow path.

This rib leaves the fluid dynamics conditions of the gas flow substantially unchanged in the central zone of the channel 5 and detunes the eigenfrequencies of the aerofoils of the array 1, and so tends to achieve the same goal obtained by the embodiments shown in the attached figures.

In the design phase, although keeping the cross-sections of the central portions 7a, 7b and 7c unchanged, the external geometry of the aerofoils 5a, 5b and 5c is determined so as to reduce the aerodynamic interactions between adjacent aerofoils by detuning the eigenfrequencies of the critical vibrations modes.

It is thus possible to achieve greater stability from the aeroelastic view point.

At the same time, the weight of the array is not increased or only slightly increased and, seeing that the geometrical variation is related to the outer shape of the aerofoils, it is possible insert the platform 4a.

In addition, the particular configuration of the aerofoils 5a, 5b and 5c enables maintaining a high level of aerodynamic efficiency, because the leading and trailing angles and the profile of the high-pressure and low-pressure sides in the central zone of the channel 5 do not change, as the cross-section of the central portions 7a, 7b and 7c is constant along the circumference of the channel 5 and variations in pitch are relatively small or non-existent. In particular, aerofoils 5b are particularly advantageous from the aerodynamic viewpoint because the angular pitch and the position of the leading and trailing edges remain perfectly constant along the entire circumference.

Furthermore, aerofoils 5b can be used without any problems even when the inter-blade channels have a relatively small dimension in the circumferential direction (i.e. when the array has a large number of aerofoils).

It is evident from the foregoing that modifications and variants can be made to the array 1 without leaving the scope of protection defined in the appended claims.

In particular, each sector of the array 1 can comprise a different number of aerofoils from those indicated by way of example.

As mentioned above, the detuning can be applied indifferently to stators and to rotors and indifferently to compressors and to turbines.

Furthermore, the difference between directions 6a and 6c could lie not in the curvature, but in the inclination with respect to an ideal plane orthogonal to axis 1a.

The invention claimed is:

1. An aerofoil array for a gas turbine system, the array comprising:
   a) an inner annular platform and an outer annular platform, which extend about a longitudinal axis and radially delimit an annular channel for a gas flow;
   b) a plurality of aerofoils, which are housed in said annular channel, are arranged at a substantially constant pitch about said longitudinal axis and are constituted by:
   respective central portions,
   respective outer radial ends, each defining a connecting portion that joins the corresponding central portion with said outer annular platform, and
   respective inner radial ends, each defining a connecting portion that joins the corresponding central portion with said inner annular platform;
   said aerofoils comprising first aerofoils and second aerofoils extending along first and, respectively, second directions, which are substantially radial with respect to said longitudinal axis; said second aerofoils having at least one different geometrical feature with respect to said first aerofoils, in order to intentionally vary the eigenfrequencies of the second aerofoils with respect to those of the first aerofoils said first and second aerofoils being arranged about said longitudinal axis with a sequence that is regularly repeated all along said annular channel;
   on sectioning the central portions of said first and second aerofoils with a curved sectional surface corresponding to the theoretical trajectory of the gas flow at any given radius, with respect to said longitudinal axis, the cross-sections of said central portions are the same; said first and second directions defining the directions in which said cross-sections are stacked;
   wherein said different geometrical feature is defined by the curvature and/or inclination of said second directions, with respect to the one of said first directions; the different curvature and/or inclination of said directions resulting in a translation of the cross sections so that some zones of the aerofoils have a slight shifting in the angular pitch and/or a slight staggering in the axial direction between the leading edges and between the trailing edges.

2. An array according to claim 1, wherein said central portions have a radial extension equal to at least 60% of the radial height of said aerofoils.

3. An array according to claim 1, further comprising a plurality of sectors, which are each made in a single piece and are equal to one another; each said sector comprising at least one of said first aerofoils and at least one of said second aerofoils.

4. An array according to claim 1, wherein said aerofoils comprise third aerofoils, which have at least one further different geometrical feature with respect to said first and second aerofoils, in order to intentionally vary the eigenfrequencies of the third aerofoils with respect to those of the first and second aerofoils.

5. An array according to claim 4, wherein the external geometry of said third aerofoils is intentionally different from that of said first and second aerofoils, without varying the cross-sections of the central portions of said first, second and third aerofoils, at any given radius with respect to said longitudinal axis.

6. An array according to claim 4, wherein said third aerofoils have a rib arranged on the pressure side and parallel to a plane tangential to the gas flow path.

\* \* \* \* \*